Figure 1:
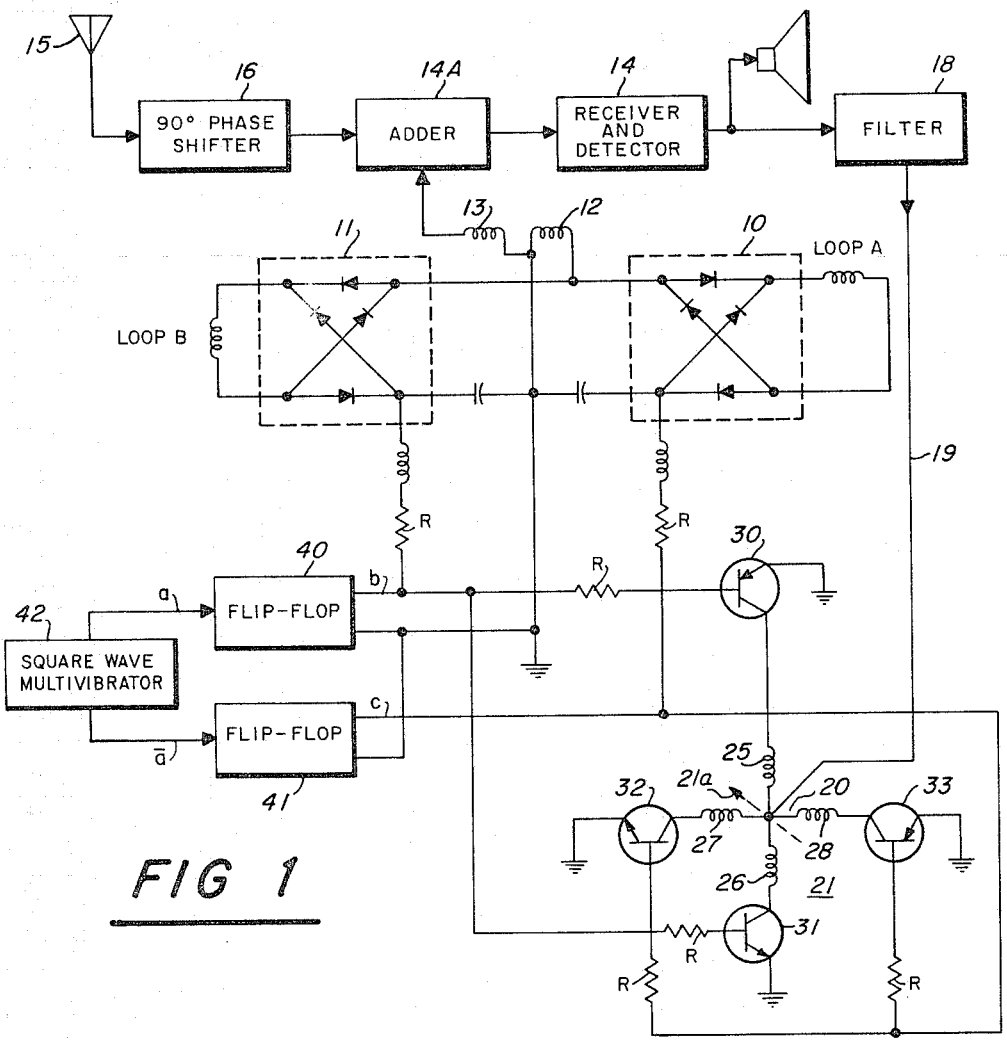

Feb. 7, 1967 L. R. WEILL 3,303,504
AUTOMATIC RADIO DIRECTION FINDER SYSTEM
Filed Sept. 14, 1964

INVENTOR.
LAWRENCE R. WEILL
BY
ATTORNEYS

__United States Patent Office__

3,303,504
Patented Feb. 7, 1967

3,303,504
AUTOMATIC RADIO DIRECTION
FINDER SYSTEM
Lawrence R. Weill, 4015 Vista Place,
San Diego, Calif. 92116
Filed Sept. 14, 1964, Ser. No. 396,447
6 Claims. (Cl. 343—120)

The invention described herein may be manufactured and used by or for the Government of the United States of America for governmental purposes without the payment of any royalties thereon or therefor.

This invention relates to automatic radio direction finders and is particularly directed to novel switching circuits for deriving directional information from the radio frequency signals of quadrature directional loops and an omni-directional sensing antenna.

Common radio direction finders employ two right angle loops connected to either a motor-driven rotating loop or to a motor-driven goniometer which simulates loop rotation. The loops have a "figure 8" radio frequency signal pattern and are used in conjunction with an omni-directional antenna. When the radio frequency signal of the omni-directional antenna is shifted 90° and added to the loop voltages, the resulting cardioidal pattern unambiguously indicates the direction of the signal source. To obviate the disadvantages of mechanically rotating a loop or goniometer, stationary structures have been proposed with switching circuits for electrically synthesizing rotation. Unfortunately, the connecting and disconnecting of different portions of the structure can disturb the high frequency impedances and can distort the cardioidal patterns. This is of particular significance when the loop structures are part of the tuned circuit.

The general object of the invention accordingly is to provide an improved radio direction finder system.

A more specific object of this invention is to provide a radio direction finder system with no moving parts, and with switch circuits which present no changes in impedance of the radio frequency circuits.

The objects of this invention are attained with a pair of directional antennas oriented to produce right angle signal patterns and an omnidirectional, or vertical, antenna. The omnidirectional signal, after 90° phase shift, is added to the loop voltages and applied to a radio receiver and detector for deriving an envelope of the signal voltages at the terminals of the loop antennas. A reversing switch is placed in the two leads of each of the pair of loops and are so driven in succession as to cause the cardioid to "aim" successively in each of four orthogonal directions. A resolver and direction indicator with four equally, angularly disposed field-producing elements are provided. A freely rotatable pointer is responsive to the resultant field of the four elements. Four switches are coupled, respectively, between said elements and the output of the envelope detector. Finally, a square wave generator with flip-flops is provided for successively operating the four switches to connect the resolver elements to the detector in synchronism with the successive operation of the loop reversing switches. As will appear, the switching circuits reverse polarities and open and close circuits so as to prevent changes of impedance in the signal circuits.

Figure 2:
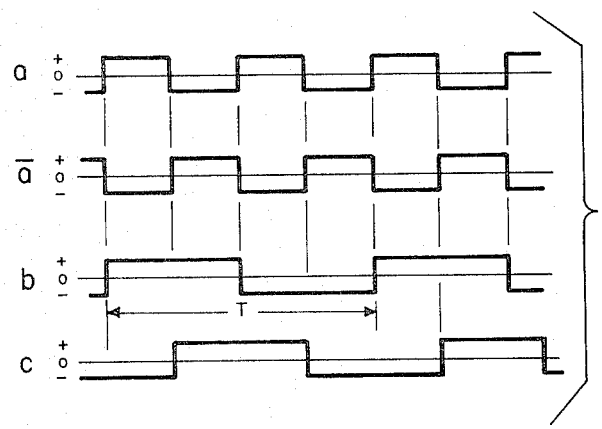

Other objects and features of this invention will become apparent to those skilled in the art by referring to the preferred embodiment described in the following specification and shown in the accompanying drawing in which:

FIG. 1 shows a schematic diagram of the principal information circuits of the preferred embodiment; and FIG. 2 is a family of curves showing the principal switching voltages employed in the system of FIG. 1.

Antenna A and antenna B are each of the type which will produce a figure-8 directional pattern. Antennas A and B are preferably loops and are so oriented that the figure-8 patterns are at right angles. The radio frequency signals at the terminals of loop A and of B are applied to the primary winding 12 through reversing switches 10 and 11. The coupled secondary winding 13 is connected to the input of the adder circuit 14A and the radio receiver 14. The omnidirectional sensing antenna 15 is also connected to the input of the adder through the 90° phase shifter 16. The applied signals are all added and detected to produce an envelope. The detected envelope is variable in four discrete steps, the step frequency of which is determined by the switching rate of the switches 10 and 11, hereinafter to be more fully described. The component in the output of the receiver-detector corresponding to the switching or commutating rate of switches 10 and 11 is selected by filter 18 and is applied through conductor 19 to the common terminal 20 of the direction indicator 21.

The specific indicator illustrated in FIG. 1 comprises four quadrature elements 25 and 26 as well as elements 27 and 28. The indicator is of the resolver type and the elements shown are inductance coils capable of producing a resultant magnetic field which will determine the rotational position of a pivoted permanent magnet armature needle, shown at 21a, floating in the field of the four elements. The armature with indicating needle is assumed to have finite inertia and to be capable of integrating, or resolving the four successively applied fields to produce the rotational position indicative of the direction of the resultant field. Coils 25 and 26 are axially aligned and are at right angles to the axially aligned coils 27 and 28. The circuits from common point 20 through coils 25, 26, 27 and 28, respectively, to a reference potential, such as ground, are completed through transistors 30, 31, 32 and 33. In the embodiment shown the controlled switch circuit comprises the emitter-collector circuit of the transistor, while the controlling electrode is the base. The control electrodes of switch transistors 30 and 31 are connected together and to the output of flip-flop 40, while the control electrodes of switches 32 and 33 are connected together and to the output of flip-flop 41. Transistor switches 30 and 31 are of opposite types, that is, of the PNP and NPN types, respectively, so that one transistor is on while the other is off in response to a binary voltage applied to the commonly connected control electrodes. Likewise transistors 32 and 33 are, respectively, of the NPN and PNP types so that they, too, are on and off in response to the binary voltage of flip-flop 41.

The complementary outputs $a$ and $\bar{a}$ of square wave free running multivibrator 42 alternately drive flip-flops 40 and 41 to their opposite stable conditions. The multivibrator and flip-flop voltages have fast rise and decay time and swing between positive and negative voltages with respect to reference ground.

According to an important feature of this invention, the outputs of flip-flops 40 and 41 also drive the reversing switches 10 and 11. The particular reversing switches shown are of the type comprising four diodes arranged in the four sides of a balanced-modulator bridge. The two-level voltages at the outputs of the flip-flops are sufficient to firmly bias the diodes to off and on conduction. Also, these two-level voltages are sufficient to bias to conduction and to nonconduction the switching transistors in series with the resolver coils 25–28.

Because the conduction resistance of diodes and transistors are usually quite low, it is desirable to insert current limiting resistors R in each lead to the switching elements. Also, radio frequency choke coils should be connected in the reversing switch circuit to isolate the antenna circuits.

The operation of the circuits of FIG. 1 can best be analyzed by reference to the control voltage diagrams of FIG. 2. The complementary square wave output waves at the out terminals of the multivibrator are shown on lines $a$ and $\bar{a}$ of FIG. 2. If, as contemplated here, flip-flop 40 responds only to differentiated voltages of one polarity, the output $b$ of flip-flop 40 will be one-half the multivibrator frequency of voltage, as shown in FIG. 2. Likewise, the output of flip-flop 41 shown on line $c$ of FIG. 2 is one-half the mutlivibrator frequency. Because the flip-flops are driven by complementary waves $a$ and $\bar{a}$, output $c$ is displaced 90° behind the voltage $b$. It will be noted now that during the time interval T the two binary voltages of waveforms $b$ and $c$ assume the four possible combinations of plus and minus values. These four combinations applied to the two reversing switches 10 and 11 effectively define signals from the four cardioidal patterns in the four quadrants of right-angle loops A and B. At the same time the four combinations of voltages connected in synchronism the four resolver field producing elements 25, 26, 27 and 28 so that the net field of the resolver will orient the freely rotating magnetic needle in a direction indicating the direction of the received signal.

It can be seen that both loops A and B are always connected to the receiver through the reversing switches 10 and 11. Since A and B are not mutually coupled the impedance presented to the receiver is constant regardless of the switch states. This holds even if the impedance of A differs from that of B.

By those skilled in the art many modifications may be offered in the specific circuit details of the embodiment of FIG. 1 without departing from the scope of the appended claims.

What is claimed is:

1. In combination in an automatic direction finder,
    a pair of directional antennas oriented to produce right angle signal patterns,
    a radio frequency receiver and detector coupled to said antennas for deriving the signal voltages at the terminals of said antennas,
    a first and a second reversing switch connected between the input of the said receiver and, respectively, said antenna terminals,
    a directional indicator with four equally angularly disposed field-producing elements, and a rotatable pointer responsive to the resultant field of said elements,
    four switches coupled, respectively, between said elements and the output of said detector, and
    a square wave generator,
    said reversing switches and said four switches being responsive to the square wave of said generator for successively energizing said elements in synchronism with the successive operations of said reversing switches.

2. In combination in a radio frequency direction finder,
    two directional antennas for generating two quadrature figure-8 signal patterns,
    an omnidirectional sensing antenna,
    means for adding radio frequency signals of said antennas and detector means for generating voltages corresponding in amplitude to the cardioidal signal patterns in the four quadrants of said directional antennas,
    first and second switch means connected, respectively, between said directional antennas and said adding means for selectively reversing the polarity of the signal at the terminals of said directional antennas, said switch means being responsive to a binary control voltage,
    a square wave source for generating binary voltages connected to said switches for successively reversing said signal polarity to sequentially add signals from said four quadrants, and
    means coupled to said adding means for indicating the direction of the resultant signal.

3. In the combination defined in claim 2, said indicating means comprising four orthogonally disposed field producing elements, and
    switches for successively coupling said elements to the output of said detector means, said switches being connected to said square wave source for energizing said elements in synchronism with the reversing operations of said first and second switch means.

4. In the combination defined in claim 2, said indicating means comprising four orthogonally disposed resolver coils,
    four transistors, the controlled current path through said transistors being connected in circuit between said detector and, respectively, said coils, the control electrodes of said transistors being connected to said square wave source.

5. In the combination defined in claim 4, the mentioned transistors in circuit with oppositely disposed coils being of NPN and PNP types, respectively; the control electrodes of the two transistors being connected directly together so that one of said transistors becomes conductive at the instant the other transistor becomes non-conductive in response to said binary voltage.

6. In the combination defined in claim 5, said square wave source comprising:
    a free running multivibrator, with two output terminals for delivering, respectively, two square waves, one square wave being the complement of the other,
    two flip-flops connected, respectively, to said two multivibrator terminals and being responsive to differentiated voltages of one polarity only for reversing the stable state of the flip-flop at one-half the frequency of said multivibrator,
    the output of one flip-flop being applied to one pair of transistors and one reversing switch, and
    the output of the other flip-flop being applied to the other pair of transistors and the other reversing switch.

No references cited.

RODNEY D. BENNETT, *Acting Primary Examiner.*
CHESTER L. JUSTUS, *Examiner.*
B. L. RIBANDO, *Assistant Examiner.*